(12) United States Patent
Leclercq et al.

(10) Patent No.: US 9,249,920 B2
(45) Date of Patent: Feb. 2, 2016

(54) METHOD OF MANUFACTURING A TUBULAR INSULATING DEVICE AND CORRESPONDING DEVICE

(75) Inventors: Berangere Leclercq, Gennevilliers (FR); Olivier Bernard, Midland, MI (US); Alexandre Potier, Gennevilliers (FR)

(73) Assignee: CARBONE LORRAINE COMPOSANTS, Gennevilliers (FR)

( * ) Notice: Subject to any disclaimer, the term of this patent is extended or adjusted under 35 U.S.C. 154(b) by 1250 days.

(21) Appl. No.: 12/682,095

(22) PCT Filed: Oct. 7, 2008

(86) PCT No.: PCT/FR2008/001397
§ 371 (c)(1),
(2), (4) Date: Jun. 29, 2010

(87) PCT Pub. No.: WO2009/080915
PCT Pub. Date: Jul. 2, 2009

(65) Prior Publication Data
US 2010/0294391 A1 Nov. 25, 2010

(30) Foreign Application Priority Data
Oct. 8, 2007 (FR) ...................................... 07 07038

(51) Int. Cl.
*B29C 53/36* (2006.01)
*F16L 59/14* (2006.01)
(Continued)

(52) U.S. Cl.
CPC ............. *F16L 59/141* (2013.01); *B29C 53/385* (2013.01); *C04B 35/536* (2013.01);
(Continued)

(58) Field of Classification Search
CPC B32B 18/00; C04B 37/008; C04B 2235/422; C04B 2235/425; C04B 2235/48; C04B 2235/77; C04B 2237/02; C04B 2237/086; C04B 2237/363; C04B 2237/385; C04B 2237/704; F16L 59/025; F16L 59/029
USPC ........................ 156/89.25, 196, 215; 428/408
See application file for complete search history.

(56) References Cited

U.S. PATENT DOCUMENTS 2,965,080 A * 12/1960 Wallis et al. ................... 122/356
3,421,184 A * 1/1969 Ford et al. ...................... 425/408
(Continued)

FOREIGN PATENT DOCUMENTS

| DE | 2518940 | 11/1976 | | |
|---|---|---|---|---|
| GB | 393259 | 6/1933 | | |
| JP | 06109373 A | * | 4/1994 | ................ F27D 1/00 |

*Primary Examiner* — Carson Gross
(74) *Attorney, Agent, or Firm* — Ladas & Parry LLP

(57) ABSTRACT

An insulating material is fed in and shaped by superposing a plurality of N layers $C_i$ (3) of the insulating material. For each layer $C_i$, a plurality of $n_i$, axial insulating elements $E_i$ precut from the insulating material is formed, a rough form of the tubular insulating device is formed by using an adhesive to assemble the $N_i$ elements $E_i$ of each layer $C_i$ which are juxtaposed along a plurality of joining zones $J_i$, so that the plurality of joining zones $J_{i+1}$ of a layer $C_{i+1}$ is offset relative to the plurality of joining zones $J_i$, of the adjacent layer $C_i$. Then, by the adhesive is polymerized, and the tubular element rough form is subjected to a heat treatment. The method is economical and makes it possible to obtain a device of high mechanical strength.

20 Claims, 5 Drawing Sheets

(51) Int. Cl.
 B29C 53/38 (2006.01)
 C04B 35/536 (2006.01)
 C04B 35/634 (2006.01)
 C04B 37/00 (2006.01)
 B29K 707/04 (2006.01)

(52) U.S. Cl.
 CPC ........ C04B 35/63476 (2013.01); C04B 37/008 (2013.01); *B29K 2707/04* (2013.01); *C04B 2235/424* (2013.01); *C04B 2235/425* (2013.01); *C04B 2235/77* (2013.01); *C04B 2235/78* (2013.01); *C04B 2237/363* (2013.01); *C04B 2237/586* (2013.01); *C04B 2237/68* (2013.01); *C04B 2237/704* (2013.01); *C04B 2237/765* (2013.01); *Y10T 156/1031* (2015.01); *Y10T 156/1033* (2015.01)

(56) References Cited

U.S. PATENT DOCUMENTS

| | | | |
|---|---|---|---|
| 3,948,406 A | | 4/1976 | Papanicolaou et al. |
| 6,146,611 A | * | 11/2000 | Dillon et al. .............. 423/445 R |
| 2004/0076810 A1 | | 4/2004 | Blain et al. |
| 2006/0220320 A1 | * | 10/2006 | Potier et al. .................... 277/308 |
| 2007/0259185 A1 | * | 11/2007 | Hingst et al. .................. 428/408 |
| 2009/0214781 A1 | * | 8/2009 | La Forest et al. .......... 427/249.2 |

* cited by examiner

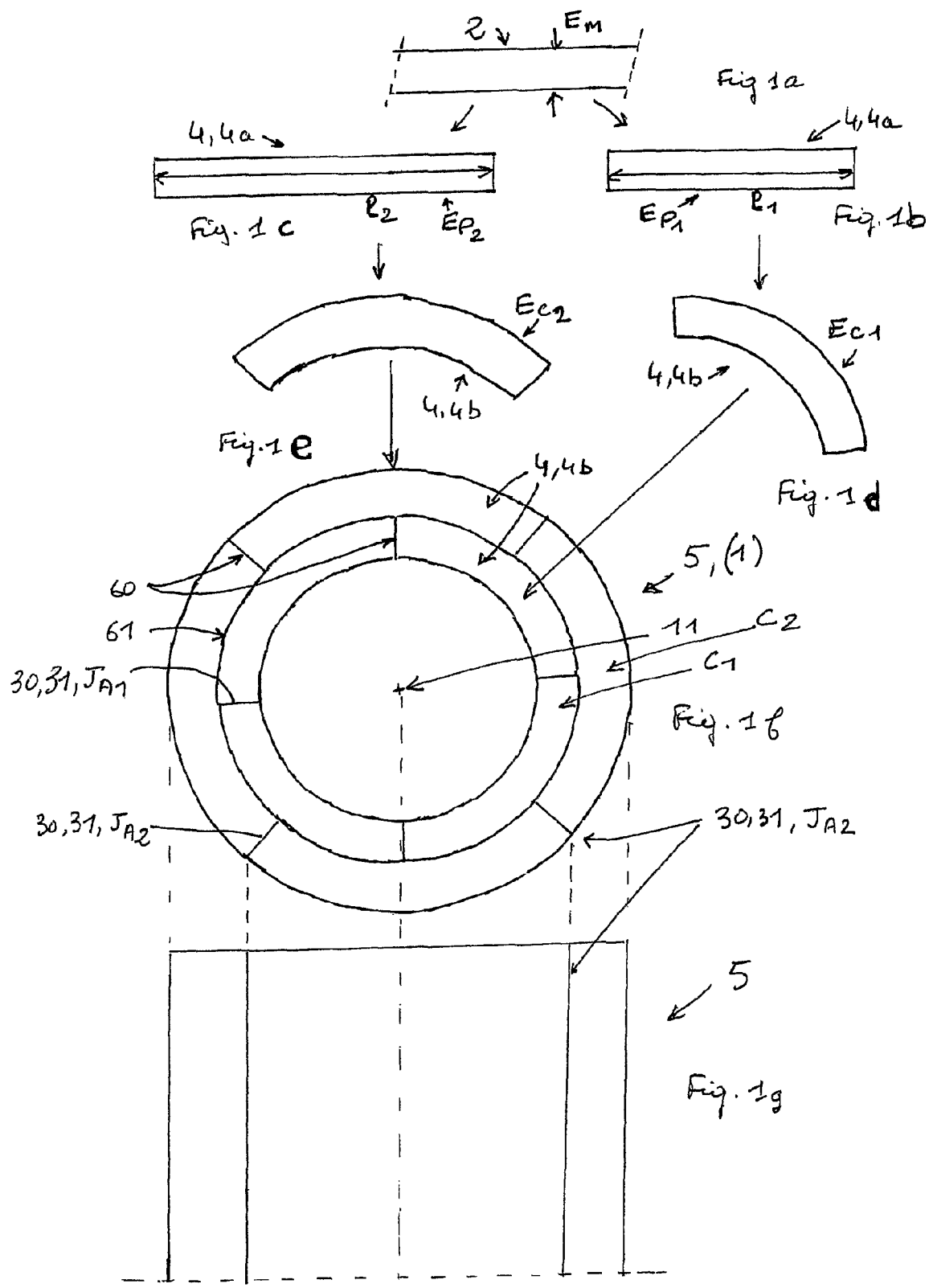

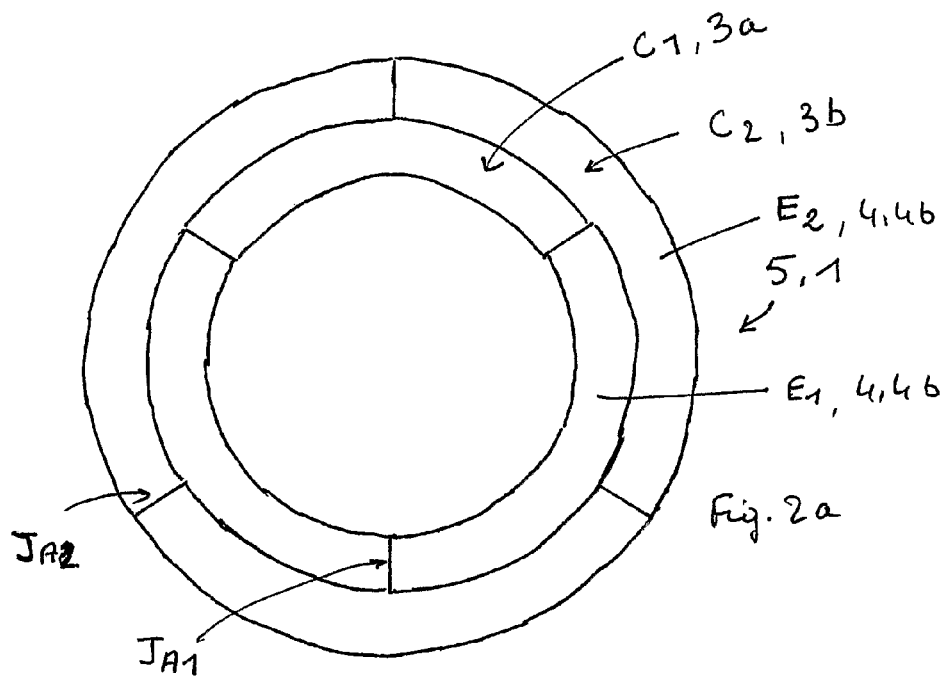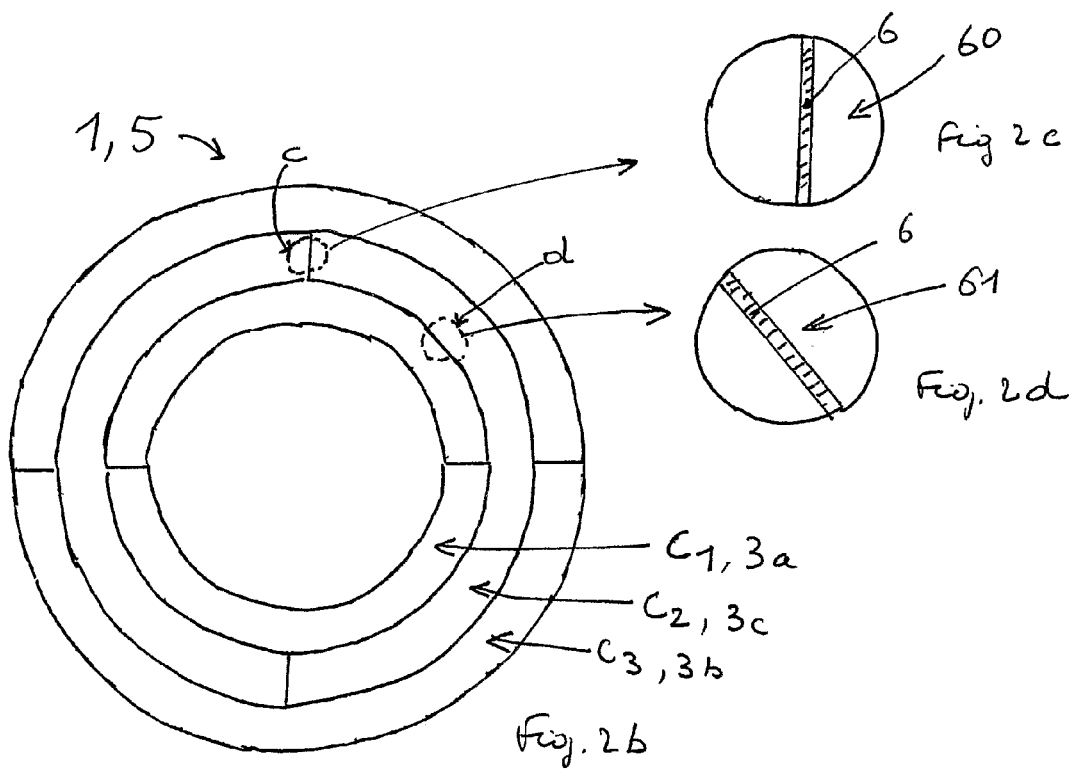

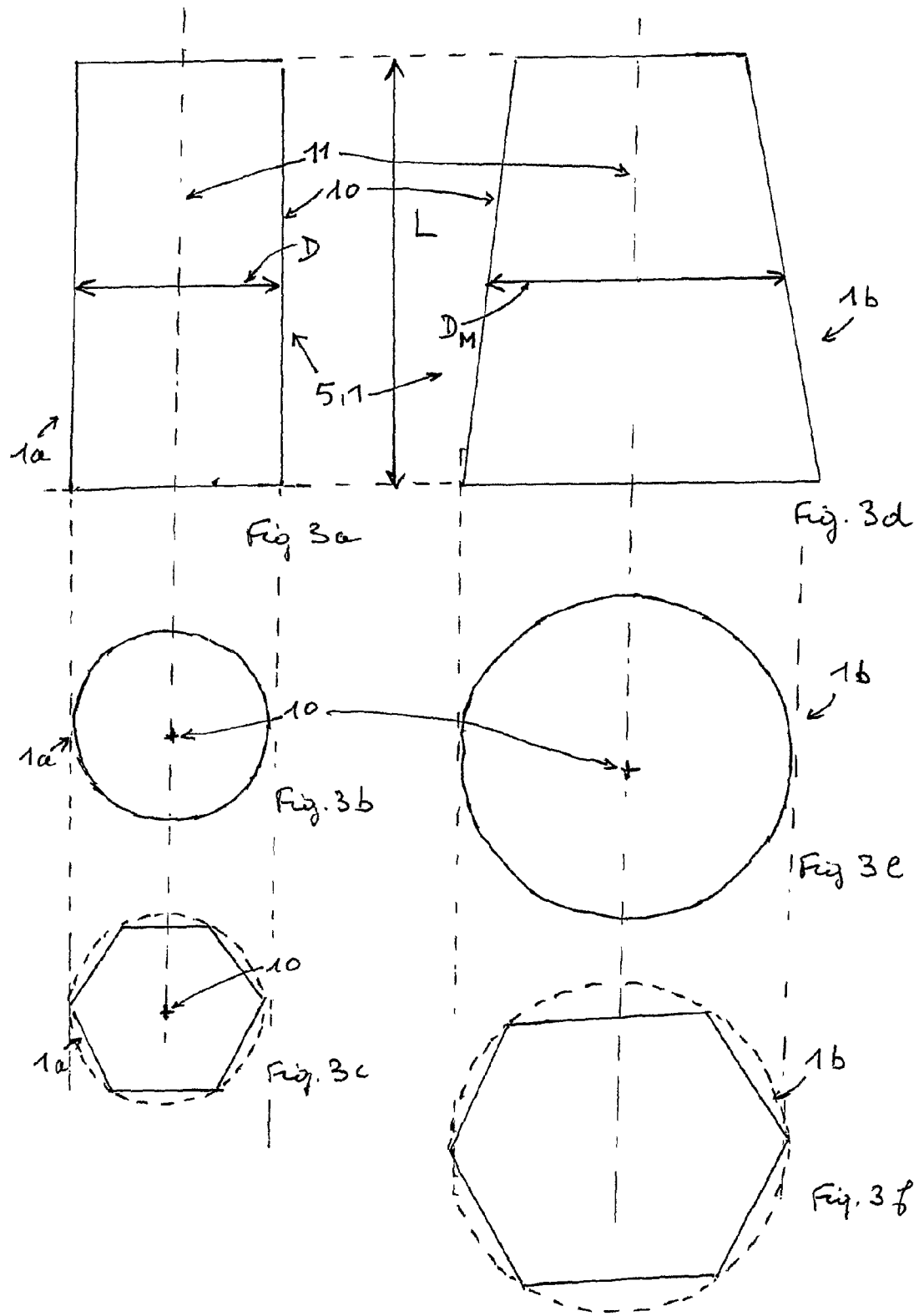

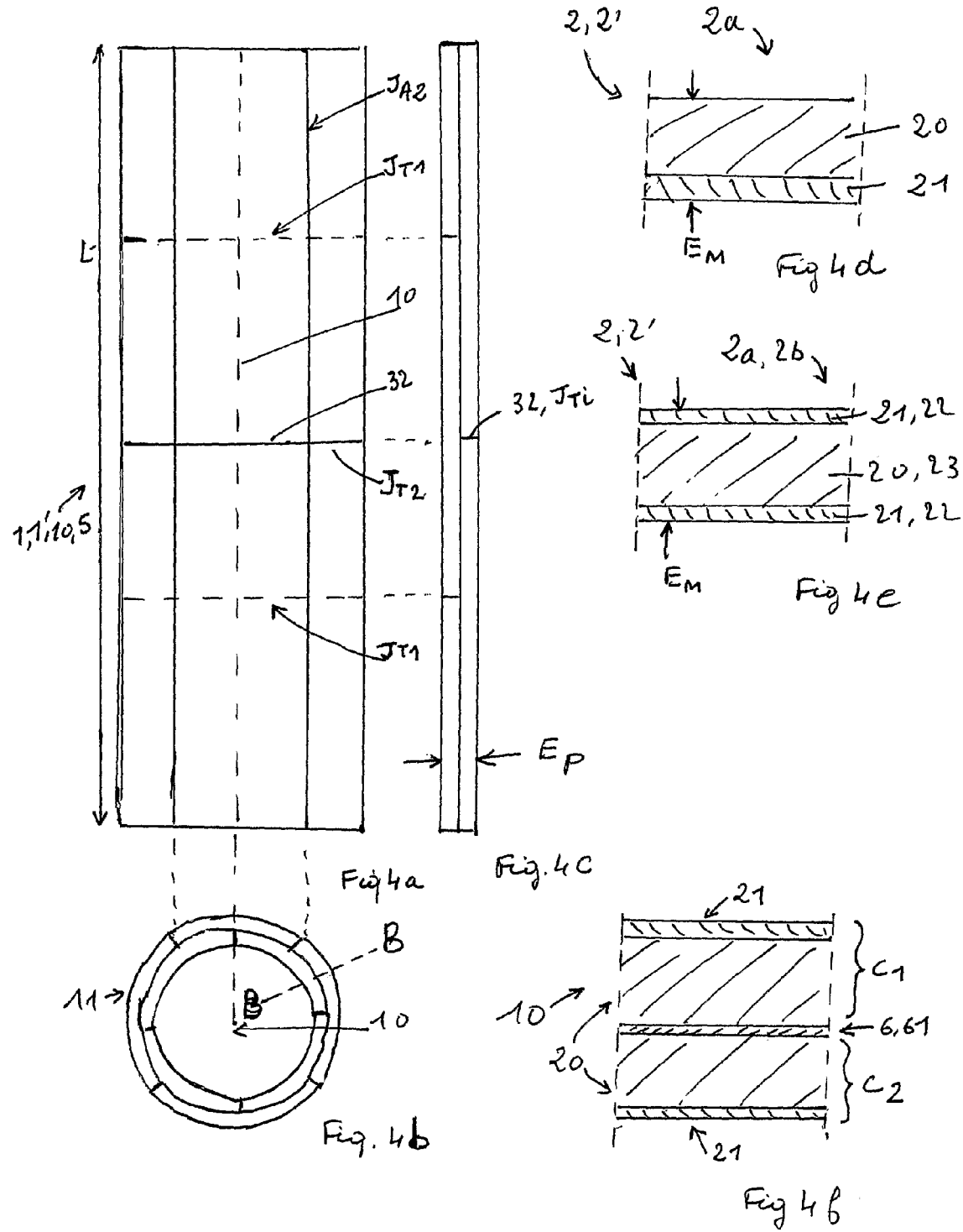

METHOD OF MANUFACTURING A TUBULAR INSULATING DEVICE AND CORRESPONDING DEVICE

FIELD OF THE INVENTION

This invention relates to the manufacture of refractory carbon material capable to be used as high-temperature thermal insulators in ovens operating at high temperatures and in a non-oxidizing atmosphere.

This invention relates more particularly to expanded graphite base cylindrical or tubular insulators, intended for high-temperature ovens.

PRIOR ART

Application FR 2 849 651 describes an insulating structure comprising at least one flexible layer with a "dense" compressed expanded graphite particle base, of which the density is at least equal to 400 kg/m$^3$ and at least one other layer, "sub-dense", also with an expanded graphite base, having a density that is lower than that of the dense layer, typically less than 400 kg/m$^3$.

The same patent application further describes the use of the insulating structure for manufacturing parts of cylindrical form, by coiling insulating structures in a spiral such as described hereinabove. The main disadvantage in this technique resides in the fact the layers become detached during the heat treatment to which is submitted the cylinder obtained after coiling.

This technique of coiling in spirals is also described in other patents or patent applications such as U.S. Pat. No. 6,143,601 and U.S. 2004/0076810.

On the other hand, application FR 2 849 651 describes a method of manufacturing comprising, in addition to a step of coiling, the use of a curving technique for the manufacture of portions of cylinders with the insulating structure such as described hereinabove.

PROBLEMS PUT FORTH

The invention aims to overcome several problems simultaneously, the method of manufacturing of tubular insulating devices according to the invention having to make possible all at the same time:
- obtaining devices of high mechanical resistance across the entire range of high temperature of use, being able to exceed 1500° C.,
- obtaining devices having a high "insulating power/mass ratio",
- a method of manufacturing that is simple and economical as it makes use of a single and same technology, and furthermore easy to adapt to any form of tubular device.

OBJECT OF THE INVENTION

The applicant has now perfected a method of manufacturing tubular devices used in particular for the insulating of high-temperature ovens by curving insulating structures making it possible to obtain tubular wall elements, then gluing on edges of these elements and stacking of two layers of insulating structures with an offset of the glued edges forming a junction between two juxtaposed elements.

In this method of manufacturing a tubular insulating device comprising a lateral wall of thickness Ep, of axial length L, provided with an axial direction, is fed an insulating material with bi-dimensional structure of thickness $E_M$<Ep, with for example $E_M$ at most equal to 0.5 Ep, and said insulating material is put into form by superposing a plurality of N layers $C_i$ of said insulating material, with i ranging from 2 to N, said tubular insulating device comprising at least two layers $C_1$ and $C_2$ of said insulating material.

This method is characterised in that:

a) for each layer $C_i$, a plurality of $n_i$ precut axial insulating elements $E_i$ is formed in said insulating material in such a way that said $n_i$ insulating elements $E_i$ can form said layer $C_i$, after an edge-to-edge juxtaposition and thanks to an adapted deformation, b) a rough form of said tubular insulating device is formed by:

b1) assembling, thanks to an adhesive, more preferably on an axial shaping mandrel, layer after layer, and by beginning with the first inside layer $C_1$, the $n_i$ elements $E_i$ of each layer $C_i$ juxtaposed edge to edge according to a plurality of joining zones $J_i$, the elements $E_{i+1}$ of the layer $C_{i+1}$ being offset in relation to the elements $E_i$ of the layer $C_i$ in such a way as to offset the plurality of joining zones $J_{i+1}$ in relation to the plurality of joining zones $J_i$, and as such obtain in fine a tubular insulating device of high mechanical strength, b2) then by polymerizing said adhesive, in such a way as to rigidify said rough form, c) said rough form of tubular element is subjected to a heat treatment, in such a way as to carbonize said adhesive, and as such obtain, where applicable after separation from said mandrel, said tubular insulating device.

This method makes it possible to overcome the problems put forth.

Indeed, the applicant has observed that the devices obtained via this method of manufacturing did indeed have the high mechanical strength required in particular for their use as an insulating sleeve for ovens in an industrial environment, and, thanks to an appropriate choice of the insulating material, an excellent "insulating power/mass" ratio.

Moreover, as it does not require coiling, the manufacture of these devices is simple as well as capable of being applied to any form of tubular device, since it comprises a preparation of insulating elements, for example by cutting in an insulating material in strips or in sheets, possibly followed by their forming, and followed by their assembly thanks to an adhesive, by forming at least two layers. This method calls upon only a limited number of pieces of industrial equipment in such a way that it is economical and also nevertheless of great flexibility in order to form devices of all sorts of forms or dimensions.

DESCRIPTION OF THE FIGURES

All of the figures relate to the invention.

FIGS. 1a to 1g diagrammatically show different steps of the manufacture of a tubular insulating device (1) according to the invention.

FIG. 1a shows, as a partial section according to a transversal plane, the insulating material (2) with bi-dimensional structure of thickness $E_M$ used to form said insulating elements (4).

FIGS. 1b and 1c are views, as a transversal section, of the planar insulating elements (4, 4a) formed by cutting in said material (2) in FIG. 1a, and noted respectively $E_{P1}$ and $E_{P2}$, the planar insulating element $E_{P1}$ in FIG. 1b, intended to form an insulating element of the first layer $C_1$, having a width $l_1$ less than that $l_2$ of the planar insulating element $E_{P2}$ in FIG. 1c and intended to former an insulating element of the second layer $C_2$.

FIGS. 1d and 1e, analogous to FIGS. 1b and 1c, show the curved insulating elements $E_{C1}$ and $E_{C2}$ formed by curving respectively the planar insulating elements $E_{P1}$ and $E_{P2}$ of FIGS. 1b and 1c.

FIG. 1f is a view, as a transversal section in a plane perpendicular to its axial direction (11), of the rough form (5) formed by assembling, on two layers $C_1$ and $C_2$, of the eight curved insulating elements $E_{C1}$ and $E_{C2}$ of FIGS. 1d and 1e (four insulating elements per layer $C_i$), this assembly being formed by a gluing on the edge (60) between curved elements (4, 4b) of the same layer $C_i$, and by so-called inter-layer gluing (61) between the layers $C_1$ and $C_2$, the layers $C_1$ and $C_2$ being directed in such a way that the axial junctions $J_{A1}$ (30, 31) of the first layer $C_1$ (3, 3a) are angularly offset in relation to the axial junctions $J_{A2}$ (30, 31) of the second layer $C_2$ (3, 3b).

FIG. 1g is a partial side view of the rough form (5) in FIG. 1f.

FIG. 2a is analogous to FIG. 1f and shows another modality of rough form (5), and therefore tubular insulating device (1), further comprising two layers $C_1$ and $C_2$, each layer $C_i$ comprising 3 insulating elements (4, 4b) per layer $C_i$.

FIG. 2b, analogous to FIG. 2a, shows another modality of rough form (5) and of device (1), wherein the number N of layers $C_i$ is equal to 3, each layer $C_i$ comprising two elements $E_i$.

FIGS. 2c and 2d are enlarged views of the curved portions "c" and "d" in FIG. 2b, which respectively show the gluing on edge (60) between curved elements (4b) of the same layer $C_i$ and the inter-layer gluing (61) between two adjacent layers $C_i$ and $C_{i+1}$, is between the layers $C_1$ and $C_2$ in FIG. 2b.

FIGS. 3a to 3f show different forms of lateral walls (10) of the devices (1) and of the corresponding rough forms (5).

FIGS. 3a to 3c relate to tubes (1a) with lateral walls (10) with constant section, along their entire axial length L.

FIG. 3a is a side view of the lateral wall (10), wherein the axial joining zones $J_i$ (30) have not been shown.

FIGS. 3b and 3c show two outside transversal sections of the lateral wall (10) in FIG. 3a, the FIG. 3b corresponding to a cylindrical wall of outside diameter D, and the FIG. 3c corresponding to a 6-faced hexagonal wall of which the outside section is inscribed in a circle of diameter D.

FIGS. 3d to 3f, analogous respectively to FIGS. 3a to 3c, relate to tubes (1b) with variable section on their axial length L and of average outside diameter $D_M$ at mid-height.

FIG. 3d shows the wall (10) of tapered form as a side view.

FIG. 3e diagrams the case of a circular section, while the FIG. 3f diagrams the case of a polygonal (hexagonal) section.

FIG. 4a, analogous to the FIG. 1g or 3a, shows a device (1) or a rough form (5) said of great axial length L, of which each layer $C_i$ comprises at least one transversal junction zone $J_{Ti}$ (32) in order to join said curved elements (4, 4b) according to said axial direction (11). The inside layer $C_1$ (3a) comprises two transversal junctions $J_{T1}$ offset axially in relation to the single transversal junction $J_{T2}$ of the outer layer $C_2$ (3b).

FIG. 4b is a bottom view of the device (1) in FIG. 4a.

FIG. 4c is an axial cross-section of the wall (10) according to the plane B-B in FIG. 4b passing through said axial direction (11).

FIGS. 4d and 4e show, as a partial transversal section, two modalities of material (2') with an expanded graphite base constituting said insulating material (2) and forming a multilayer material (2a).

FIG. 4d shows a multilayer material (2a) comprising two layers of expanded graphite: one layer referred to as "low density" (20) and a layer referred to as "high density" (21), the high-density layer (21) having for example a thickness at least two times less thick than that of the low-density layer (20).

FIG. 4e, analogous to the FIG. 4d, forms a three-layer material (2) comprising a central layer (23) forming a low-density layer (20), and two external layers (22) forming two high-density layers (21). FIG. 4f is a partial transversal section of a wall (10) comprising two layers $C_1$ and $C_2$ formed using the material in FIG. 4d and assembled with a layer of adhesive (61) between the layers $C_1$ and $C_2$. As can be seen in FIG. 4f, the high-density layers (21) form the outside and inside surfaces of said wall (10).

FIG. 5a shows, in perspective, two layers $C_1$ and $C_2$ of insulating material (2, 2') arranged on the mandrel (7).

FIG. 5b shows a section, according to the axial direction (11), of the shaping mould (8) with two half-shells (80) containing the unit constituted of the elements in FIG. 5a, in such a way as to compress said layers $C_i$ (3) between a rigid mandrel and the typically metal half-shells of the mould, and as such give predetermined dimensions to said rough form (5).

FIG. 5c shows as a side view the unit, at the output of the cast, formed by the mandrel (7) plus the rough form (5) with predetermined dimensions, the FIG. 5d showing the rough form (5) separated from the mandrel (7) shown in FIG. 5e.

DETAILED DESCRIPTION OF THE INVENTION

Figure 5A:
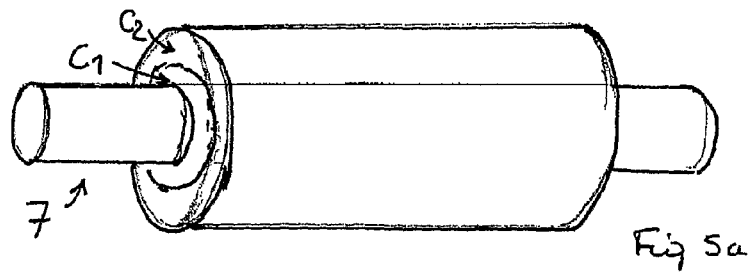
FIGS. 5a to 5e diagrammatically show different views of a modality of manufacturing a rough form (5) using a shaping mandrel (7) as well as a shaping mould (8).

According to the invention, and as shown in the FIGS. 1g and 4a, said joining zones $J_i$ (30) can include axial joining zones $J_{Ai}$ (31) of axial length at most equal to L.

However, as shown in FIGS. 4a and 4c, said joining zones $J_i$ (30) can include transversal joining zones $J_{Ti}$ (32) in such a way as to obtain a tubular insulating device (1, 1') said of great axial length L.

However, when it is not required to join the elements (4) according to said axial direction (11) as shown in the FIGS. 4a and 4c, said joining zones $J_i$ can be constituted of axial joining zones $J_{Ai}$ (31) of axial length equal to L.

Advantageously, said $n_i$ axial insulating elements $E_i$ precut (4) from the same layer $C_i$ can be identical, said plurality of junctions $J_i$ forming said plurality of axial junctions $J_{Ai}$ (31), the $n_i$ axial junctions $J_{Ai}$ (31) of said plurality being separated angularly in relation to said axial direction (11) by an angle of $360°/n_i$. However, in the case of the fabrication of a "customised" device of relatively complex configuration, it would be possible to juxtapose different insulating elements (4) by their form, in the way in which the different pieces of a puzzle are assembled, but on a surface deployed in the three-dimensional space.

As shown in the FIGS. 1f, 2a and 2b, the number N of layers $C_i$ (3) can be at least equal to 2.

The number $n_i$ of insulating elements $E_i$ (4) can be a number n which remains the same for each layer $C_i$ (3) of said tubular insulating device (1), n varying typically with said average diameter D.

As such, for example:
n can have the value of 2 for D ranging from 286 mm to 573 mm,
n can have the value of 3 for D greater than 573 mm and less than 907 mm,
n can have the value of 4 for D at least equal to 907 mm.

As shown in the FIGS. 1a to 1f, before the step b) of the method, using said $n_i$ insulating elements (4), for example using $n_i$ planar insulating elements (4a), $n_i$ curved insulating elements (4b) can be formed, in such a way as to have a radius of curvature $R_i$ in a transversal plane perpendicular to said axial direction (11), corresponding to that of said corresponding layer $C_i$, said radius $R_i$ increasing by a $C_i$ to the next layer $C_{i+1}$ of greater average diameter $D_{i+1}$.

Figure 5B:
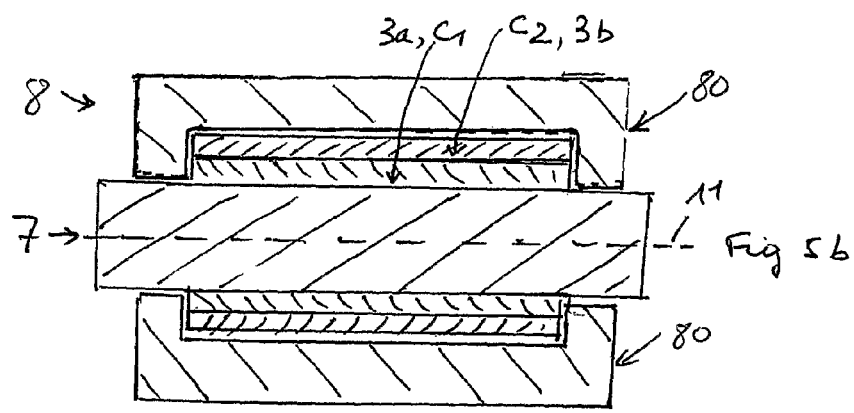
Figure 5C:
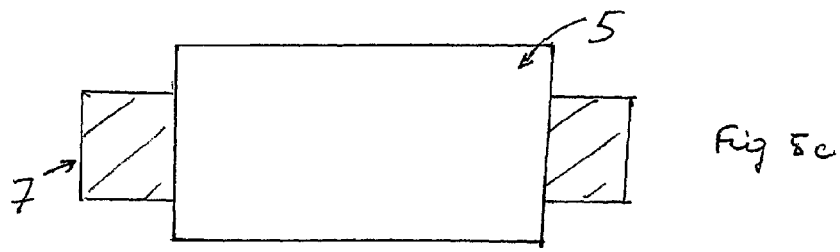
Figures 5D, 5E:
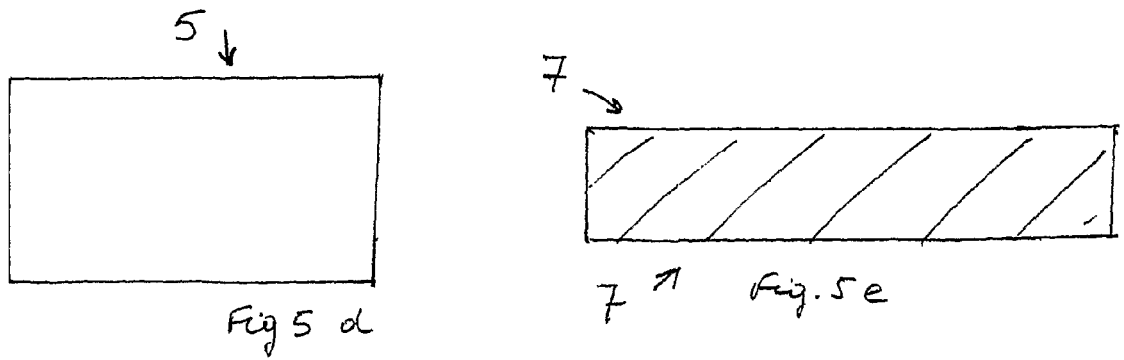

In the method according to the invention, and as shown in the FIGS. 5a to 5e, during said step b2), said rough form (5) can be placed in a shaping mould (8) comprising, for example, two half-shells (80), in such a way that, with the two half-shells (80) together and closed provide said rough form (5) and in fine said tubular insulating device (1) with predetermined and reproducible geometric dimensions.

According to the invention, said insulating material (2) can be a material (2') with an expanded graphite base of thickness $E_M$ ranging from 2 to 30 mm, and ranging preferably from 5 to 20 mm.

More preferably, and as shown in the FIGS. 4d and 4e, said material with expanded graphite base (2') can be a multilayer material (2a) comprising at least one layer referred to as "low" density (20), its density being less than 0.4 g/cm³ (400 kg/m³) and at least one layer referred to as "high" density (21), its density being at least equal to 0.4 g/cm³.

Said high-density layer (21) can have a density ranging from 0.8 g/cm³ to 1.2 g/cm³ and wherein said low-density layer (20) has a density ranging from 0.03 g/cm³ to 0.2 g/cm³.

As shown in FIG. 4e, said multilayer material (2a) can be a material referred to as "triple-layer" (2b) comprising two high density external layers (22, 21) arranged on either side of a central low density layer (23, 20).

Advantageously, in such a way as to obtain a high "insulating power/mass" ratio, the thickness $E_f$ of the low-density central layer (20, 23) can be at least twice as high than the thickness $E_h$ of the high-density external layer (21, 22), and more preferably at least three times higher.

According to the invention, said adhesive (6) can include a thermosetting resin, for example a phenolic resin, or a thermoplastic resin, said adhesive being in the form of powder or in liquid form, said adhesive being advantageously loaded with a black carbon or graphite electro-conductive powder.

Said heat treatment can include a baking at a temperature of at least 800° C., and more preferably of at least 1000° C.

Said heat treatment can include an additional methane pyrolysis flash treatment in such a way as to increase the rigidity of said insulating device.

Furthermore, said heat treatment can include a step of purifying of said insulating device wherein said insulating device is brought to 2000° C., in such a way as to remove any volatile element.

Finally, said heat treatment can be followed by a machining.

As shown in the FIGS. 3a to 3c, said tubular insulating device (1) can form a tube (1a) with constant section on its axial length L, said section being circular of diameter D or oval or polygonal.

However, as shown in the FIGS. 3d to 3f, said tubular insulating device (1) can form a tube (1b) with a uniformly variable section on its axial length L, said section being circular of average diameter $D_M$ or oval or polygonal.

For example, said axial length L can vary from 0.1 m to 3 m, and said thickness Ep can range from 5 mm to 80 mm, the L/D or L/$D_M$ ratio able to range from 0.5 to 5.

Another object of the invention is constituted by a tubular insulating device (1) typically obtained by the method according to the invention. This tubular insulating device (1) comprises a lateral wall (10) of thickness Ep ranging from 5 mm to 80 mm, of axial length L ranging from 0.1 m to 3 m, provided with an axial direction (11), said lateral wall (10) forming a superposition being constituted by a plurality of N layers $C_i$ (3) of an insulating material (2), with i ranging from 2 to N.

It is characterised in that:

a) each layer $C_i$ (3) comprises a plurality of $n_i$ axial insulating elements $E_i$ (4) constituted of said insulating material (2) in such a way that said axial insulating elements $E_i$ (4) are juxtaposed edge (40) to edge (40') according to a plurality of joining zones $J_i$ (30), b) two successive layers $C_i$ and $C_{i+1}$ are assembled thanks to an adhesive (6), said successive layers $C_i$ and $C_{i+1}$ being directed in relation to one another in such a way that the plurality of joining zones $J_{i+1}$ of said layer $C_{i+i}$ is offset in relation to the plurality of joining zones $J_i$ and said layer $C_i$, and that as well said tubular insulating device (1) obtained in fine has a high mechanical strength.

In this device, said insulating material (2) can be a material (2') with expanded graphite base of thickness $E_M$ ranging from 2 to 30 mm, and ranging preferably from 5 to 20 mm.

Said material with expanded graphite base (2') can be a multilayer material (2a) comprising at least one layer referred to as "low" density (20), its density being less than 0.4 g/cm³ (400 kg/m³) and at least one layer referred to as "high" density (21), its density being at least equal to 0.4 g/cm³.

Said high-density layer (21) can have a density ranging from 0.8 g/cm³ to 1.2 g/cm3 and wherein said low-density layer (20) has a density ranging from 0.03 g/cm³ to 0.2 g/cm³.

Said multilayer material (2a) can be a material referred to as "triple-layer" (2b) comprising two external high density layers (22, 21) arranged on either side of a central low density layer (20, 23).

Said low-density central layer (20, 23) can have a thickness $E_f$ at least twice as high than the thickness $E_h$ of the high-density external layer (21, 22), and more preferably at least three times higher.

EXAMPLES

FIGS. 1a to 5e constitute embodiments.

For the implementation of the method according to the invention, devices of complex form without rotation symmetry have as such also been manufactured, and in particularly in this case, computer means were used making it possible, using the precise geometric definition of said device (1) introduced into the computer memory, to define the plurality of insulating elements $E_i$ of each layer $C_i$, in such a way that all of the joining zones (30, 31, 32) are offset.

In the case where the insulating elements (4) are not of simple form and do not result in an even and compact tiling, computer means were used to optimise the cutting of these elements and minimise the scrap and losses of insulating material.

However, this scrap was able to be recycled by homogenising them and by incorporating them at a low percentage (more preferably <10%) into the low-density layer (20).

Different types of mandrels were used. The mandrels were coated with sliding agents in such a way as to facilitate the separation between rough form (5) and mandrel (7). Mandrels with a retractable core were also used, in such a way as to further facilitate this separation.

ADVANTAGES OF THE INVENTION

The method according to the invention has major advantages. Indeed, in addition to overcoming the problems put forth, it can easily be automated and adapted to any configuration of device (1), even of complex form.

LIST OF MARKINGS

Tubular insulating device 1
Device 1 of great axial length 1'
Tube with constant section 1a
Tube with variable section 1b
Lateral wall 10
Axial direction 11
Insulating material with bi-dimensional structure 2
Material with expanded graphite base 2'
Multilayer material 2a
Triple-layer material 2b
"Low density" layer 20
"High density" layer 21
External layer 22
Central layer 23
Layer Ci of 1 3
Inside layer 3a
Outer layer 3b
Central layer 3c
Joining zone $J_i$ of 3 30
Axial joining zone $J_{Ai}$ 31
Transversal joining zone $J_{Ti}$ 32
Axial insulating element $E_i$ 4
Planar insulating element $E_{pi}$ 4a
Curved insulating element $E_{ci}$ 4b
Juxtaposition edge 40, 40'
Rough form of 1 5
Adhesive 6
Edge-to-edge gluing edge zone 60
Inter-layer gluing zone 61
Axial mandrel 7
Shaping mould 8
Half-shells of the mould 80

The invention claimed is:

1. A method of manufacturing a tubular insulating device comprising a lateral wall of thickness Ep and of axial length L, the method comprising:
   cutting an insulating material into a plurality of axial insulating elements;
   shaping the plurality of axial insulating elements so that they have a curved shape;
   assembling a first layer of axial insulating elements by using an adhesive to attach the curved axial insulating elements along a plurality of axial joining zones; and along a plurality of transversal joining zones;
   assembling at least one more layer of axial insulating elements by using the adhesive to attach axial insulating elements around a preceding layer so that a plurality of axial joining zones in a preceding layer is offset from a plurality of axial joining zones in a subsequent layer; and a plurality of transversal joining zones in a preceding layer is offset from a plurality of transversal joining zones in a subsequent layer;
   polymerizing the adhesive; and
   subjecting the layers of axial insulating elements to a heat treatment to carbonize the adhesive.

2. The method according to claim 1, wherein said axial joining zones have an axial length different from the axial length L of the lateral wall.

3. The method according to claim 1, wherein the number of axial insulating elements is a number N which remains the same for each layer of said tubular insulating device.

4. The method according to claim 1, wherein the curved axial insulating elements are formed in such a way as to have a radius of curvature $R_i$, increasing in each subsequent layer of axial insulating elements.

5. The method according to claim 1, wherein, before the heat treatment, a rough form of the layers of axial insulating elements is placed in a shaping mold comprising two half-shells for adjusting the geometric dimensions of the rough form.

6. The method according to claim 1, wherein said insulating material is a material with expanded graphite base of thickness $E_M$ ranging from 2 to 30 mm.

7. The method according to claim 6, wherein said material with expanded graphite base is a multilayer material comprising at least one low density layer, having a density less than 0.4 g/cm$^3$ and at least one high density layer, having a density at least equal to 0.4 g/cm$^3$.

8. The method according to claim 7, wherein said high-density layer has a density ranging from 0.8 g/cm$^3$ to 1.2 g/cm$^3$ and wherein said low-density layer has a density ranging from 0.03 g/cm$^3$ to 0.2 g/cm$^3$.

9. The method according to claim 7, wherein said multilayer material has two high density external layers arranged on either side of a central low density layer.

10. The method according to claim 9, wherein the thickness of the low-density central layer is at least twice as thick as the thickness of each of the high-density external layers.

11. The method according to claim 1, wherein said adhesive comprises a thermosetting resin, or a thermoplastic resin, said adhesive being in the form of a powder, or in liquid form, and said adhesive being advantageously loaded with a black carbon or graphite electro-conductive powder.

12. The method according to claim 1, wherein said heat treatment comprises a baking at a temperature of at least 800° C.

13. The method according to claim 12, wherein said heat treatment comprises an additional methane pyrolysis flash treatment for increasing the rigidity of the insulating device.

14. The method according to claim 12, wherein said heat treatment comprises a step of purifying said insulating device, wherein said insulating device is brought to 2000° C. for removing any volatile element.

15. The method according to claim 1, wherein said heat treatment is followed by a machining.

16. The method according to claim 3, wherein the tubular insulating device forms a tube having a constant transversal section along the axial length L, said section being circular of diameter D, or oval, or polygonal.

17. The method according to claim 1, wherein the tubular insulating device forms a tube having a uniformly variable transversal section along the axial length L, said section being circular of average diameter $D_M$, or oval, or polygonal.

18. The method according to claim 1, wherein said axial length L is from 0.1 m to 3 m, and wherein said thickness Ep is from 5 mm to 80 mm.

19. The method according to claim 18, wherein a ratio L/D or $L/D_M$ is from 0.5 to 5.

20. The method according to claim 16, wherein N is 2, and D is from 286 mm to 573 mm.

* * * * *